(12) United States Patent
Tanaka et al.

(10) Patent No.: US 8,237,887 B2
(45) Date of Patent: Aug. 7, 2012

(54) ILLUMINATION DEVICE AND LIQUID CRYSTAL DISPLAY DEVICE

(75) Inventors: Atsuyuki Tanaka, Osaka (JP); Takeshi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 166 days.

(21) Appl. No.: 12/666,332

(22) PCT Filed: Aug. 6, 2008

(86) PCT No.: PCT/JP2008/064087
§ 371 (c)(1),
(2), (4) Date: Dec. 23, 2009

(87) PCT Pub. No.: WO2009/020138
PCT Pub. Date: Feb. 12, 2009

(65) Prior Publication Data
US 2010/0321610 A1    Dec. 23, 2010

(30) Foreign Application Priority Data
Aug. 8, 2007    (JP) .................................. 2007-207252

(51) Int. Cl.
G02F 1/1335    (2006.01)
(52) U.S. Cl. ............................................ 349/64; 349/62
(58) Field of Classification Search .................. None
See application file for complete search history.

(56) References Cited

U.S. PATENT DOCUMENTS

| | | | |
|---|---|---|---|
| 2004/0120161 A1* | 6/2004 | Hwang | 362/558 |
| 2006/0221612 A1* | 10/2006 | Song et al. | 362/247 |
| 2007/0052662 A1* | 3/2007 | Kim et al. | 345/102 |
| 2007/0070625 A1 | 3/2007 | Bang | |
| 2007/0103908 A1* | 5/2007 | Tabito et al. | 362/294 |
| 2007/0279936 A1 | 12/2007 | Song et al. | |

FOREIGN PATENT DOCUMENTS

| | | |
|---|---|---|
| EP | 1 933 081 A1 | 6/2008 |
| EP | 1 933 179 A1 | 6/2008 |
| JP | 04-112405 A | 4/1992 |
| JP | 2002-099250 A | 4/2002 |
| JP | 2003-036719 A | 2/2003 |
| JP | 2003-121837 A | 4/2003 |
| JP | 2006-286533 A | 10/2006 |
| JP | 2006-339148 A | 12/2006 |
| JP | 2007-066634 A | 3/2007 |

(Continued)

OTHER PUBLICATIONS

Official Communication issued in International Patent Application No. PCT/JP2008/064087, mailed on Sep. 2, 2008.

(Continued)

*Primary Examiner* — Thanh-Nhan P. Nguyen
(74) *Attorney, Agent, or Firm* — Keating & Bennett, LLP

(57) ABSTRACT

An illumination device includes a plurality of light source blocks defined by a first partition wall and a second partition wall, the light source blocks being provided with LEDs. The illumination device is capable of adjusting a luminance of each of the plurality of light source blocks. A projection section to diffuse the light is provided on a vertex of the first partition wall. As a result, it is possible to prevent a luminance irregularity and a color irregularity from occurring between illumination areas when adjusting the respective luminance in each of the plurality of illumination areas.

11 Claims, 7 Drawing Sheets

FOREIGN PATENT DOCUMENTS

| | | |
|---|---|---|
| JP | 2007-101862 A | 4/2007 |
| JP | 2007-103154 A | 4/2007 |
| JP | 2007-180005 A | 7/2007 |
| RU | 2 235 942 C2 | 9/2004 |
| RU | 2 268 173 C1 | 1/2006 |

OTHER PUBLICATIONS

Official Communication issued in corresponding European Patent Application No. 08826992.3, mailed on Jul. 2, 2010.

Official Communication issued in corresponding Russian Patent Application No. 2010101088, mailed on Apr. 13, 2011.

* cited by examiner

ILLUMINATION DEVICE AND LIQUID CRYSTAL DISPLAY DEVICE

BACKGROUND OF THE INVENTION

1. Field of the Invention

The present invention relates to a backlight comprising a plurality of light sources and to a liquid crystal display device provided with the backlight.

2. Description of the Related Art

Liquid crystal display devices are characterized, among other aspects, by thinness, low electricity consumption and high definition, and are getting more and more popular in the field of televisions, which conventionally use mainly cathode ray tubes (CRT), as the development of production methods of the liquid crystal display devices makes it possible to produce bigger screens. However, it is a problem that the contrast (dynamic range) of an image displayed by a liquid crystal display device is low compared to an image of a CRT. As a result, in recent years, a lot of efforts have been made to develop a technology allowing to increase image quality through an increase of the contrast of the liquid crystal display device.

For example, Japanese Patent Application Publication, Tokukai, No. 2002-99250 discloses a backlight comprising a plurality of illumination areas whose luminance is controllable independently. Further, a liquid crystal display device disclosed in Japanese Patent Application Publication, Tokukai, No. 2002-99250 virtually comprises a plurality of display areas corresponding to the illumination areas of the backlight, respectively. The luminance of the illumination light of each illumination area of the backlight is controlled according to how bright an image displayed in the corresponding display area of the liquid crystal display device is. In other words, with the configuration disclosed in Japanese Patent Application Publication, Tokukai, No. 2002-99250, in the illumination area corresponding to the display area in which a bright image is displayed, the luminance of the illumination light is controlled at a high level, while in the illumination area corresponding to the display area in which a dark image is displayed, the luminance of the illumination light is controlled at a low level. This allows for an expansion of the dynamic range, thus making it possible to achieve a liquid crystal display device capable of displaying a high-contrast image.

Japanese Patent Application Publication, Tokukai, No. 2002-99250 presents the use of a direct backlight 100 comprising a plurality of light sources 101 isolated in each illumination area by the partition wall 102, as shown in FIG. 8, as a backlight comprising a plurality of illumination areas. The light source 101 is a cold-cathode fluorescent ray tube, and a white LED (not shown in the drawings) used for luminance adjustment is disposed under the light source 101. Due to the white LED, the luminance ratio of the illumination light in adjoining luminous area is increased.

Further, according to Japanese Patent Application Publication, Tokukai, No. 2002-99250, because each illumination area is divided by the partition wall 102, the mutual interferences between adjoining illumination areas can be prevented, and it is possible to obtain an image with a higher definition.

However, the backlight 100 shown in FIG. 8 uses for each illumination area the light source 101 and the white LED. Because the light source 101 and the white LED have different wavelengths, a colored contour (color irregularity) occurs on the diffusion plate in the vicinity of the partition wall 102 when turning on a illumination area and turning off another illumination area adjoining to the lighted illumination area.

SUMMARY OF THE INVENTION

In view of the above-described problems, preferred embodiments of the present invention provide an illumination device capable of conducting a luminance adjustment for each illumination area, wherein a luminance irregularity and a color irregularity are prevented.

An illumination device in accordance with a preferred embodiment of the present invention is provided with a plurality of illumination areas delimited by a partition wall, wherein the illumination areas are provided with a light source, the plurality of illumination areas are arranged to individually adjust a luminance of each illumination area, and a diffusion section to diffuse light is provided at the vertex of the partition wall.

With the above configuration, the light emitted from the light source of the illumination area is diffused by the diffusion section provided at the vertex of the partition wall. As a result, it is possible to prevent a luminance irregularity when adjusting the luminance in each adjoining illumination area.

Further, when providing the diffusion section at the vertex of the partition wall, it is not necessary to increase the width of the partition wall in order to add the diffusion section. Further, by providing the diffusion section at the vertex of the partition wall, it is possible to dispose paths (i.e., light paths) of the light emitted from the adjoining illumination areas symmetrically with respect to the vertex of the partition wall. As a result, compared to a configuration in which the diffusion section is not provided at the vertex of the partition wall, it is possible to provide the diffusion section efficiently and to efficiently prevent a luminance irregularity caused when adjusting the luminance in each adjoining illumination area.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A preferred embodiment of the present invention is described below with reference to the attached drawings FIGS. 1 to 3C.

Figure 1:
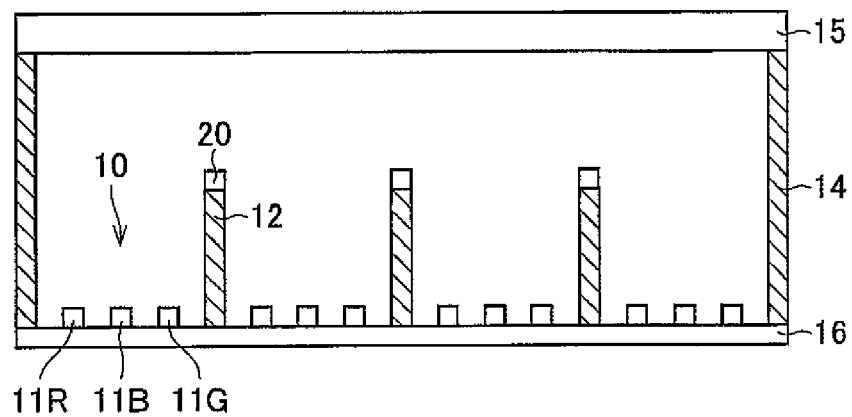
FIG. 1 is a cross-sectional view, taken along the A-A' line shown in FIG. 2, of a relevant portion of an illumination device in accordance with a preferred embodiment of the present invention.
Figure 2:
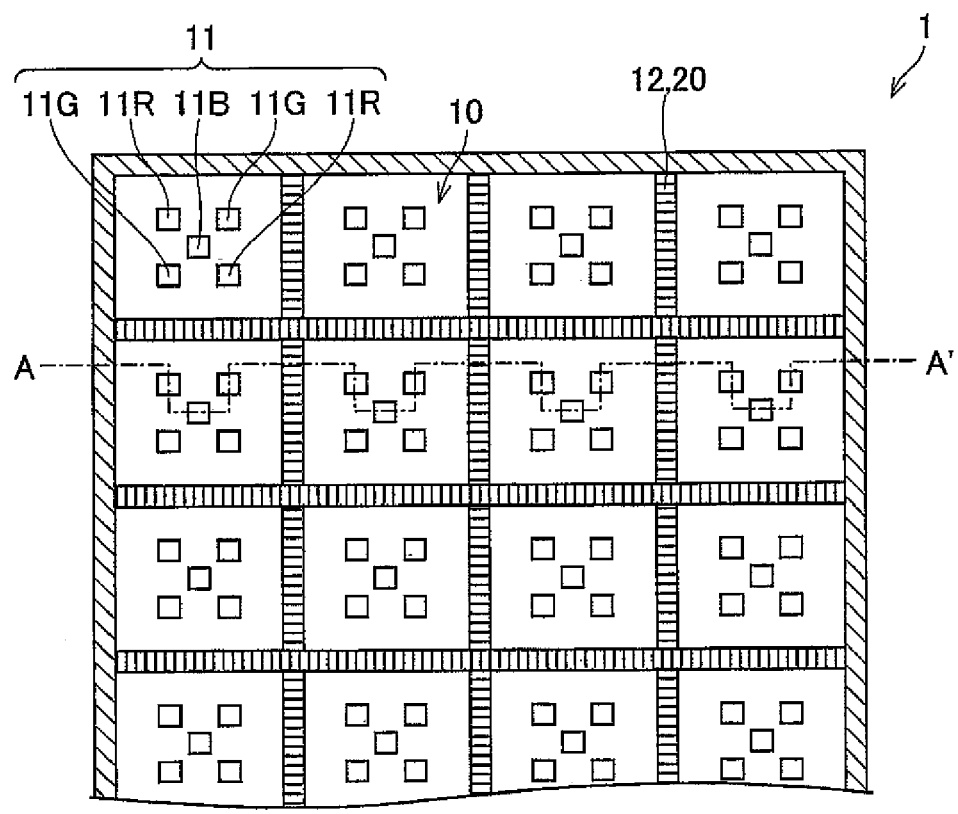
FIG. 2 is a plan view of a relevant portion of a structure of the illumination device in accordance with a preferred embodiment of the present invention.

The following is an explanation, referring to FIGS. 1 and 2, of an illumination device 1 in accordance with a preferred embodiment of the present invention.

FIG. 2 is a plan view of the illumination device 1 in accordance with a preferred embodiment of the present invention. FIG. 1 is a cross-sectional view of FIG. 2 along the line A-A'.

As shown in FIG. 2, light source blocks 10 (illumination areas), on which LEDs 11 ("LED" standing for light-emitting diode) as described below are mounted, are arranged in a matrix configuration on the illumination device 1. Further, between the light source blocks 10, a first partition wall 12, which has a projection section 20 (to be described below) thereon, is provided. The first partition walls 12 are arranged in a lattice-shaped configuration over the illumination device 1. In addition, around the illumination device 1, a second partition wall 14, higher than the first partition wall 12, is provided. The area corresponding to the light source block 10 is defined by the first partition wall, or is defined by the first partition wall and the second partition wall.

Further, as shown in FIG. 1, a reflection sheet 16 to reflect light is provided on a bottom surface of the illumination device 1. In other words, the LEDs 11, the first partition wall 12 and the second partition wall 12 are arranged on the surface of the reflection sheet 16. Additionally, the diffusion plate 15 (transparent member), which faces the reflection sheet 16, is supported by the second partition wall 14 and covers a surface of each light source block 10. The diffusion section 15 diffuses the light emitted from each light source block 10, thereby causing the illumination device 1 to serve as a surface light source arranged to emit a uniform quantity of light.

The LEDs 11 provided in each light source block 10 preferably include, as a plurality of light sources with different wavelengths, a LED 11R emitting a red light, a LED 11G emitting a green light and a LED 11B emitting a blue light, for example. Substantially at a center of the light source block 10, a single LED 11B is mounted. Additionally, two LEDs 11R and two LEDs 11G are mounted in the light source block 10 in a point symmetry substantially with respect to the LED 11B. In other words, the LED 11B, the LEDs 11R and the LEDs 11G are mounted in matrix in each light source block 10.

Because the LED 11B, the LEDs 11R and the LEDs 11G are mounted in each light source block 10 in this way, it is possible to widen a luminance ratio between adjoining light source blocks 10. Further, because the LED 11B, the LEDs 11R and the LEDs 11G are disposed in a matrix in each light source block 10, it is possible to emit light having a uniform luminance from each light source block 10.

In the present preferred embodiment, the light source blocks 10 are preferably arranged with pitches of about 28 mm, and the LED 11B, the LEDs 11R and the LEDs 11G are each disposed with intervals of about 7 mm, for example.

Further, the "on" (lighting) or "off" (not lighting) control of the LED 11B, the LEDs 11R and the LEDs 11G mounted in each light source block 10 is conducted separately in each light source block 10. As an alternative, instead of the LEDs 11, a white LED emitting a white light may be used as the light source in each light source block 10.

The projection section 20, which will be described in detail later, is provided on a surface of the first partition wall facing the diffusion plate 15 (hereafter referred to, out of convenience, as an upper surface of a vertex). In addition, a combined height of the projection section and of the first partition wall is lower than a height of the second partition wall. In other words, a space is provided between the projection section 20 and the diffusion plate 15.

In the present preferred embodiment, a combined height of the projection section 20 and of the first partition wall 12 preferably is about 10 mm, while the height of the second partition wall preferably is about 25 mm, for example. As a result, the diffusion plate 15 is disposed about 25 mm away from the surface of the reflection sheet 16 on which the LEDs 11 are disposed. In addition, the interval between the diffusion plate 15 and the projection section 20 preferably is about 10 mm, for example.

Because a space is provided between the diffusion plate 15 and the projection section 20 in this way, when adjoining light source blocks 10 are turned on concurrently, their respective light become mixed in the space. As a result, it is possible to prevent the area corresponding to the first partition wall 12 from becoming dark. In other words, it is possible to prevent luminance irregularities that would occur when adjoining light source blocks are lighted together. This makes it possible to achieve uniform illumination light.

The first partition wall 12 and the second partition wall 14 divide the light source blocks 10, and are preferably made, in the present preferred embodiment, from white polycarbonate (PC). The first partition wall 12 and the second partition wall 14 are not limited to the above-mentioned white PC, and the first partition wall 12 and the second partition wall 14 may be made from any material with a satisfying reflection coefficient.

In the present preferred embodiment, the diffusion plate 15 preferably is made of CLAREX DR-IIIC DR-60C (product name), manufactured by NITTO JUSHI KOGYO CO., LTD (thickness: 2.0 mm, haze ratio: 96%, transmission coefficient: 93%, absorption coefficient: 7%, reflection coefficient at incident angle 0°: 3.3%, reflection coefficient at incident angle 20°: 3.2%, reflection coefficient at incident angle 40°: 3.8%, reflection coefficient at incident angle 60°: 11.0%), for example.

Next, the following describes a projection section of the illumination device 1 in accordance with the embodiment of the present invention, referring to FIGS. 1 and 3A to 3C.

Figure 3A:
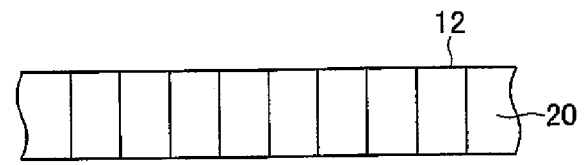
FIG. 3A is a plan view of a projection section of the illumination device in accordance with a preferred embodiment of the present invention.
Figure 3B:
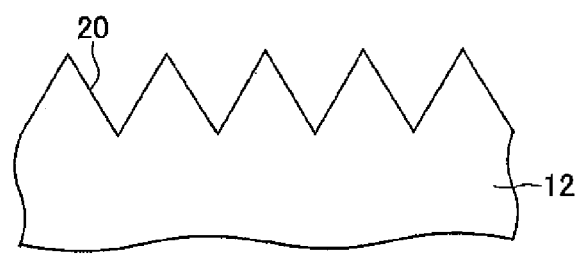
FIG. 3B is a side view of the projection section shown in FIG. 3A.
Figure 3C:
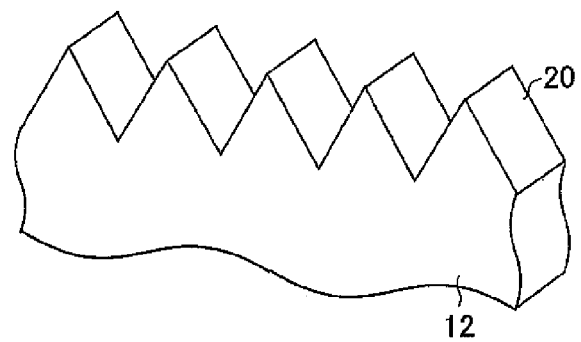
FIG. 3C is a perspective view of the projection section shown in FIG. 3A.

FIG. 3A is a plan view of the vertex of the first partition wall 12 on which is formed a projection section 20. FIG. 3B is a side view of the first partition wall 12 and of the projection section 20 shown in FIG. 3A. FIG. 3C is a perspective view of the vertex of the first partition wall 12 on which the projection section 20 shown in FIG. 3A is formed.

As shown in FIGS. 3B and 3C, the projection section 20 has a triangle cross section along a direction (extension direction) in which the first partition wall 12 is extended. Because a plurality of projection sections are arranged on the upper surface of the vertex of the first partition wall 12, the vertex of the first partition wall 12 has a saw-toothed shape with a succession of protrusions and recesses. The projection element 20 according to the present preferred embodiment is preferably made from a material identical to that of the first partition wall 12, and is formed preferably by incising the upper surface of the vertex of the first partition wall 12, after the formation of the first partition wall 12.

With the present preferred embodiment, the projection element 20 is preferably formed by making vertical incisions in the first partition wall 12. The incisions are formed preferably by incising the upper surface of the vertex of the first partition wall 12 at an oblique angle of about 45°, for example, vertically with respect to the extension direction of the first partition wall 12. Further, in the present preferred embodiment, the height in the vertical direction of the projection section 20 with regard to the upper surface of the vertex of the first partition wall 12 preferably is about 1 mm, and the pitch of the extension of the first partition wall 12, that is the interval between the respective summit of two adjoining triangles, preferably is about 1 mm, for example.

The light emitted from the LEDs 11 of the light source block 10 as shown in FIG. 1 is reflected on a side surface of the first partition wall 12 and on the upper surface of the vertex of the first partition wall 12. The light reflected therefrom is then irradiated onto the diffusion plate 15 and is finally projected towards the exterior from the diffusion plate 15.

As can be understood from FIG. 1, light from each RGB LED to a vertex of the first partition wall 12 takes a different path (light path). It is considered that this difference of the light paths is the cause of the color irregularity. In other words, when a light emitted by each of the LEDs 11R, the LEDs 11G and the LED 11B reaches the upper surface of the vertex of the first partition wall 12, the light is reflected at different angles depending on the wavelength and is irradiated to the neighboring diffusion plate 15 at the different angles. To put it differently, the light from each LEDs 11R, LEDs 11G and LED 11B takes a different light path, and therefore the light from each LEDs 11R, LEDs 11G and LED 11B irradiates a different area.

As a result, when turning on one of adjoining light source blocks 10 while turning off the other, the light from the turned-on light source block 10 is irradiated on the neighboring diffusion plate 15 and thereby the differences between the light paths are reflected on the neighboring diffusion plate 15, in the case that the projection element is not provided on the upper surface of the vertex of the first partition wall 12, in other words in the case that the upper surface of the vertex of the first partition wall 12 is flat. The difference in the light path is, as a result, perceived by human eye as a colored contour (color irregularity).

In the present preferred embodiment, the projection section 20 is provided on the upper surface of the vertex of the first partition wall 12. In this case, when the light emitted respectively from the LEDs 11R, the LEDs 11G and the LED 11B reaches the projection section 20, the light is reflected by the saw-toothed shape defined by the succession of protrusions and recesses of a plurality of projection elements 20. Then, the reflected light is again reflected, at a different angle, by the adjoining projection section 20.

In other words, the respective light emitted by the LEDs 11R, the LEDs 11G and the LED 11B changes angle due to the saw-toothed shape defined by the succession of protrusions and recesses of the plurality of projection elements 20, and because the reflection is repeated several times, the light is diffused. Then, the diffused light is irradiated by the diffusion plate 15. As a result, it is possible to gradate the color irregularity. In other words, it is possible to reduce the color irregularity.

Because the light is diffused by the shape defined by the projection element 20, a colored contour shaped identically to the plane surface of the projection section 20 (see FIG. 3A) is irradiated on the diffusion plate 15. However, due to fine pitches of the protrusions and recesses of the projection sections 20 and to the above-mentioned gradation effect, the colored contour of the plane surface of the projection section 20 is hardly visible to the human eye.

While it is possible to effectively reduce the color irregularity when the pitches of the protrusions and recesses of the projection section 20 are, for example, about 1 mm, the color irregularity reduction effect increases with pitches finer than about 1 mm, for example. Accordingly, finer pitches of the protrusions and recesses of the projection section 20 are preferable.

By providing the projection section 20 on the upper surface of the vertex of the first partition wall 12 in this way, the color irregularity irradiated on the diffusion plate 15 when one of adjoining light source blocks 10 is turned on while the other is turned off can be reduced, compared to a configuration in which the projection element 20 is not provided.

The present invention is not limited to the present preferred embodiment in which, as described above, the projection section 20 has a triangle cross section along the extension direction of the first partition wall 12. The present invention may have any configuration in which a plurality of projection sections 20 is arranged along the extension direction of the first partition wall, and the projection section 20 has a surface along the extension direction of the first partition wall 12. For example, it is also acceptable that surfaces substantially vertical with respect to the extension direction of the partition wall 12 be repeatedly provided so as to be adjoining to each other in the extension direction. That is, it is acceptable that the first partition wall 12 have a quadrilateral cross section along its extension direction.

Further, it is possible to use the illumination device 1 according to the present preferred embodiment as a backlight of a liquid crystal display device. The illumination device 1 according to the present preferred embodiment is able to control individually the turning-on and turning-off of each light source block 10. Because of this, in the display screen image of the liquid crystal display device, it is possible to control the luminance to be at a high level in the light source block 10 corresponding to the display area in which a relatively bright image is being displayed, and to control the luminance to be at a low level in the light source block 10 corresponding to the display area in which a relatively dark image is being displayed. It is thus possible to provide a liquid crystal display device with a wide dynamic range.

In addition, with the illumination device in accordance with the present preferred embodiment, because it is possible to prevent the color irregularity occurring between adjoining light source blocks 10 when turning on the light in one of the light source blocks 10 and turning off the light in the other, it is possible to provide a liquid crystal display device in which a wide dynamic range is achieved but the color irregularity is prevented.

Second Preferred Embodiment

Next, a second preferred embodiment of the present invention is described below with reference to FIGS. 1 and 4A to 4C. A projection element in the second preferred embodiment preferably has a shape different from that in the first preferred embodiment. Because the first preferred embodiment and the second preferred embodiment are similar in all other respects, the explanations on the same subject matter will not be repeated here.

Figure 4A:
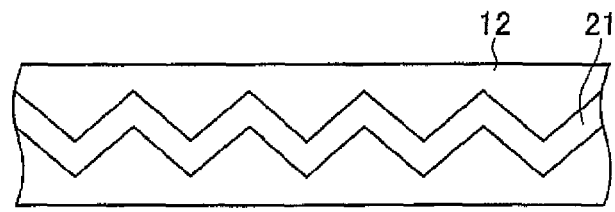
FIG. 4A is a plan view of a projection section of the illumination device in accordance with a preferred embodiment of the present invention.
Figure 4B:
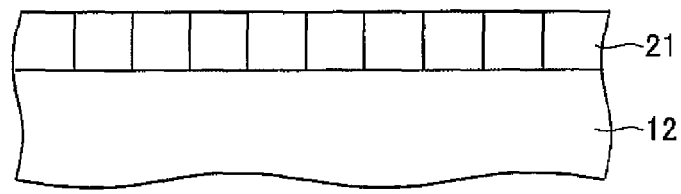
FIG. 4B is a side view of the projection section shown in FIG. 4A.
Figure 4C:
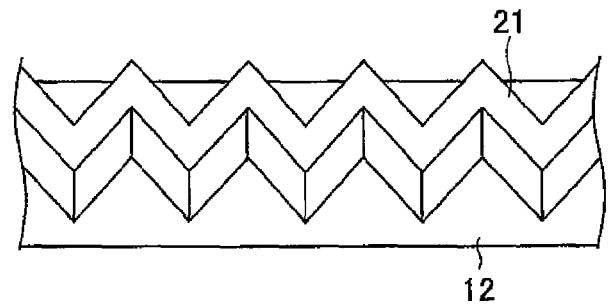
FIG. 4C is a perspective view of the projection section shown in FIG. 4A.

FIG. 4A is a plan view of a vertex of a first partition wall 12 on which a projection section (diffusion section) 21 is provided, in place of the projection section 20 previously described. FIG. 4B is a side view of the first partition wall 12 and of the projection section 21 shown in FIG. 4A. FIG. 4C is a perspective view of the projection section 21 shown in FIG. 4A.

As shown in FIGS. 4A-4C, with the projection section 21, a surface parallel to a side surface of the first partition member 12 is formed with determined pitches so as to have a repeatedly bended shape, that it to say, a shape identical to that of a folding screen. Further, the projection section 21 has an upper surface (the surface on the side facing to the diffusion plate 15) that is flat.

With the present preferred embodiment, the projection section 21 is formed by making incisions at approximately 45°, for example, in a side surface of the vertex of the first partition wall 12. Further, with the present preferred embodiment, the projection element 21 having a repeatedly bended shape preferably is about 1 mm, for example, in length (incision depth) in a direction vertical to the side surface of the first partition wall 12, and the pitches of the repeatedly bended shape, in other words the interval between two apexes of the folding screen-like shape, preferably are about 1 mm, for example.

Because the projection element 21 is provided on the vertex of the first partition wall 12, as shown in FIG. 1, the light emitted respectively from the LEDs 11R, the LEDs 11G, and the LED 11B is reflected by the repeatedly bended shape of the projection element 21 when reaching the projection element 21. The reflected light is then reflected at another angle by an adjoining repeatedly bended shape.

In other words, the angle of the light emitted respectively by the LEDs 11R, the LEDs 11G and the LED 11B is changed by the repeatedly bended shape, and the light is diffused due to the repetition of the plurality of reflections. Then, the diffused light is irradiated by the diffusion plate 15. As a result, it is possible to gradate the color irregularity irradiated by the diffusion plate 15. In other words, it is possible to reduce the color irregularity.

Because the light is diffused by the repeatedly bended shape of the projection section 21, the colored contour, which has the same shape as a planar shape of the projection element 21 (see FIG. 4A), is irradiated by the neighboring diffusion plate 15. However, the bending of the projection section 21 is finely pitched, and the above-described gradation effect of color irregularity is also attained. Therefore, the colored contour having the planar shape of the projection element 21 is hardly visible to the human eye.

While it is possible to effectively reduce the color irregularity when a pitch of the protrusions and recesses of the projection section 20 is, for example, about 1 mm, the color irregularity reduction effect increases with pitches finer than about 1 mm, for example. Accordingly, the bending of the projection element 21 is preferably more finely pitched.

By providing the projection element 21 on the upper surface of the vertex of the first partition wall 12 in this way, the color irregularity irradiated on the diffusion sheet 15 when one of adjoining light source blocks 10 is turned on while the other is turned off can be reduced, compared to a configuration in which the projection element 21 is not provided.

Third Preferred Embodiment

Next, a third preferred embodiment of the present invention is described below with reference to the attached FIG. 1 and FIGS. 5A to 5C. A projection element in the third preferred embodiment preferably has a shape that is different from those in the first and second preferred embodiments. Because the third preferred embodiment is similar to the first and second preferred embodiments in all other respects, the explanations on the same subject matter will not be repeated here.

Figure 5A:
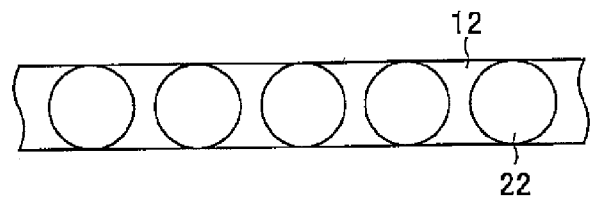
FIG. 5A is a plan view of a projection section of the illumination device in accordance with a preferred embodiment of the present invention.
Figure 5B:
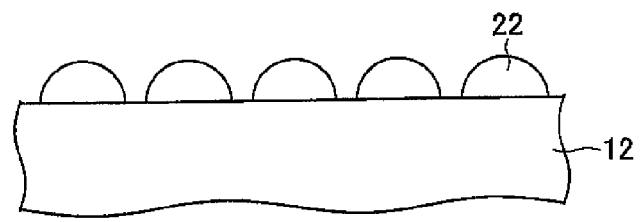
FIG. 5B is a side view of the projection section shown in FIG. 5A.
Figure 5C:
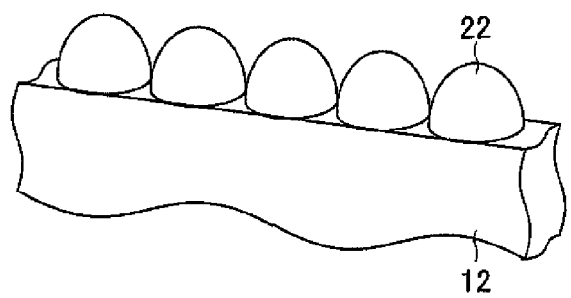
FIG. 5C is a perspective view of the projection section shown in FIG. 5A.

FIG. 5A is a plan view of the vertex of the first partition wall 12 on which a projection section 22 is provided, in place of the projection section 20 or the projection section 21 previously described. FIG. 5B is a side view of the first partition wall 12 and of the projection section 22 shown in FIG. 5A. FIG. 5C is a perspective view of the projection section 22 shown in FIG. 5A.

As shown in FIGS. 5A-5C, the projection section 22 is hemispherical or substantially hemispherical. On an upper surface of a vertex of a first partition wall 12, a plurality of projection sections 22 is arranged along an extension direction of the first partition wall 12. The projection section 22 is formed thereby by processing the vertex of the first partition wall 12.

The process in order to form the projection section 22 may be, for example, the use of a metal mold to mold the projection section 22.

With the present preferred embodiment, the projection elements 22 preferably have a hemispherical or substantially hemispherical shape with an approximately 1 mm radius, for example, and are provided on the first partition wall with about 1.3 mm pitches, for example. Adjoining projection sections 22 may be connected, or may be provided with an interval as shown in FIG. 5A.

Because the projection section 22 is provided on the upper surface of the vertex of the first partition wall 12, as shown in FIG. 1, the light respectively emitted from the LEDs 11R, the LEDs 11G and the LED 11B is reflected by the hemispherical or substantially hemispherical shape of the projection element 22 when reaching the projection element 22. The diffused light is again reflected and diffused by the adjoining projection section 22. In other words, the light emitted respectively from the LEDs 11R, the LEDs 11G and the LED 11B is repeatedly reflected several times and is diffused by the hemispherical or substantially hemispherical shape of the adjoining projection section 22.

Because the diffused light is then irradiated onto the neighboring diffusion plate 15, it is possible to gradate the color irregularity. In other words, it is possible to reduce the color irregularity.

At this point, because the light is diffused according to the hemispherical or substantially hemispherical shape of the projection section 22, a colored contour shaped like the planar surface of the projection section 22 (see FIG. 5A) is irradiated on the neighboring diffusion plate 15. However, because the projection sections 22 are finely pitched, and because of the gradation effect of the color irregularity, the colored contour having the planar shape of the projection section 22 is hardly visible to the human eye.

In addition, because the projection section 22 is hemispherical or substantially hemispherical, the colored contour overlaps and the colored contour thus overlapped is irradiated on the diffusion plate 15. As a result, it is possible to reduce the visibility of the colored contour. When using, for example, about 1.3 mm pitches for the projection section 22, it is possible to efficiently reduce the color irregularity. However, pitches finer than about 1.3 mm allow for a more efficient reduction of color irregularity. Accordingly, the projection element 22 is preferably more finely pitched.

Because a projection element 22 is provided on the upper surface of the vertex of the first partition wall 12 in this way, the color irregularity irradiated on the diffusion sheet 15 when one of adjoining light source blocks 10 is turned on while the other is turned off can be reduced, compared to a configuration in which the projection element 22 is not provided.

Fourth Preferred Embodiment

Next, a fourth preferred embodiment of the present invention is described below with reference to FIG. 1 and FIGS. 6A-6C. A projection element in the fourth preferred embodiment preferably has a shape different from those in the first, second, and third preferred embodiments. Because the fourth preferred embodiment is similar to the first, second and third preferred embodiments in all other respects, the explanations on the same subject matter will not be repeated here.

Figure 6A:
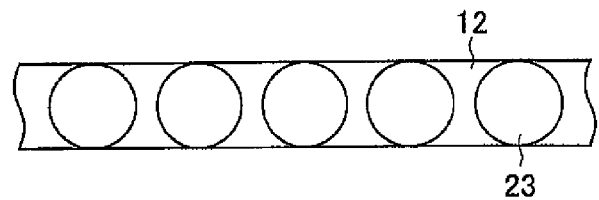
FIG. 6A is a plan view of a projection section of the illumination device in accordance with a preferred embodiment of the present invention.
Figure 6B:
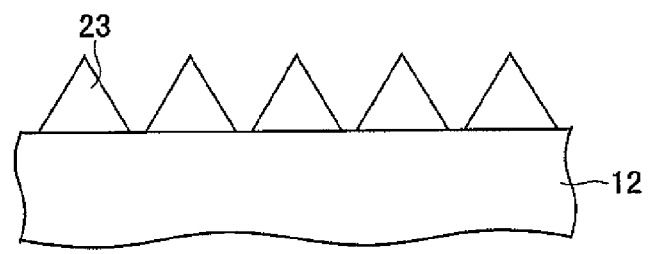
FIG. 6B is a side view of the projection section shown in FIG. 6A.
Figure 6C:
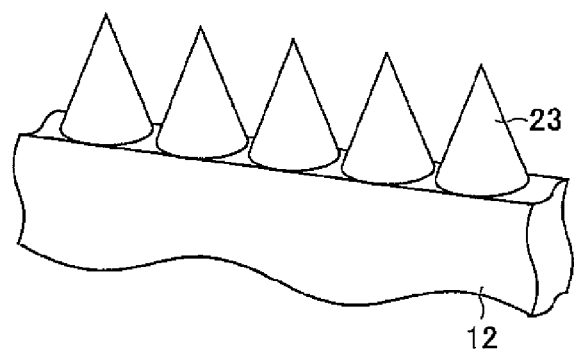
FIG. 6C is a perspective view of the projection section shown in FIG. 6A.

FIG. 6A is a plan view of the vertex of the first partition wall 12 on which a projection section 23 is provided, in place of the projection section 20, the projection section 21 or the projection section 22 previously described. FIG. 6B is a side view of the first partition wall 12 and of the projection section 23 shown in FIG. 6A. FIG. 6C is a perspective view of the projection section 23 shown in FIG. 6A.

As shown in FIGS. 6A-6C, the projection section 23 preferably is conical. On an upper surface of a vertex of the first partition wall 12, a plurality of projection sections 23 is arranged along an extension direction of the first partition wall 12. The projection section 23 is preferably formed by processing the vertex of the first partition wall 12.

The process in order to form the projection section 23 may be, for example, the use of a metal mold to mold the projection section 23.

With the present preferred embodiment, the projection element 23 preferably has a conical shape with an approximately 1 mm radius, for example, and is provided on the first partition wall with about 1.3 mm pitches, for example. Adjoining projection sections 23 may be connected, or may be provided with intervals as shown in FIG. 6A.

Because the projection section 23 is provided on the upper surface of the vertex of the first partition wall 12, as shown in FIG. 1, the light respectively emitted from the LEDs 11R, the LEDs 11G and the LED 11B is reflected by the conical shape of the projection element 23 when reaching the projection element 23. The diffused light is again reflected and diffused by the adjoining projection section 23.

In other words, the light emitted respectively from the LEDs 11R, the LEDs 11G and the LED 11B is repeatedly reflected several times and is diffused by the conical shape of the adjoining projection section 23. Because the diffused light is then irradiated by the neighboring diffusion plate 15, it is possible to gradate the color irregularity. In other words, it is possible to reduce the color irregularity.

At this point, because the light is diffused by the conical shape of the projection section 23, a colored contour shaped like the flat surface of the projection section 23 (see FIG. 6A) is irradiated on the neighboring diffusion plate 15. However, because the projection section 23 is finely pitched, and because of the gradation effect of the color irregularity, the colored contour having planar shape of the projection section 23 is hardly visible to the human eye.

In addition, because the projection section 23 is conical, the colored contour overlaps and the overlapped colored contour is irradiated on the diffusion plate 15. As a result, it is possible to reduce the visibility of the colored contour. When using, for example, approximately 1.3 mm pitches for the projection section 23, it is possible to efficiently reduce the color irregularity. However, pitches finer than about 1.3 mm, for example, allow for a more efficient reduction of color irregularity. Accordingly, the projection element 23 is preferably finely pitched.

Because a projection element 23 is provided on the upper surface of the vertex of the first partition wall 12 in this way, the color irregularity irradiated on the diffusion sheet 15 when one of adjoining light source blocks 10 is turned on while the other is turned off can be reduced, compared to a configuration in which the projection element 23 is not provided.

Fifth Preferred Embodiment

Next, a fifth preferred embodiment of the present invention is described below with reference to FIG. 1 and FIGS. 7A to 7C. The fifth preferred embodiment preferably differs from the first, second, third, and fourth preferred embodiments in that a diffusion section is provided in place of the projection section in the fifth preferred embodiment. Because the fifth preferred embodiment is similar to the first, second, third, and fourth preferred embodiments in all other respects, the explanations on the same subject matter will not be repeated here.

Figure 7A:
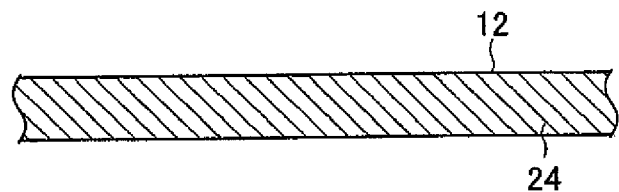
FIG. 7A is a plan view of a diffusion section of the illumination device in accordance with a preferred embodiment of the present invention.
Figure 7B:
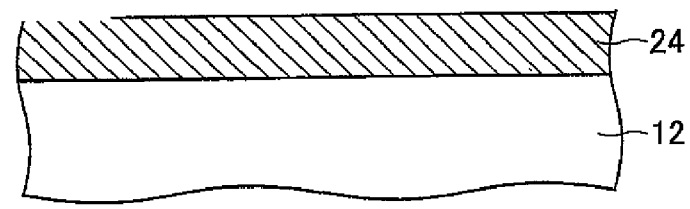
FIG. 7B is a side view of the diffusion section shown in FIG. 7A.
Figure 7C:
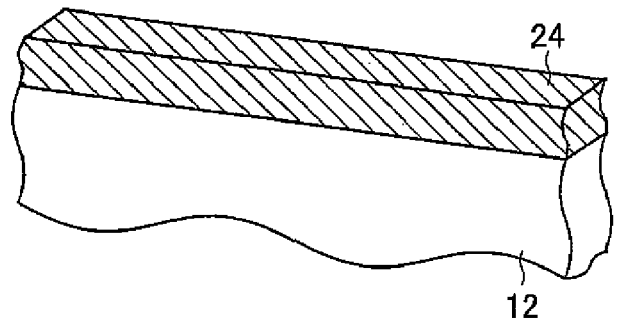
FIG. 7C is a perspective view of the diffusion section shown in FIG. 7A.
Figure 8:
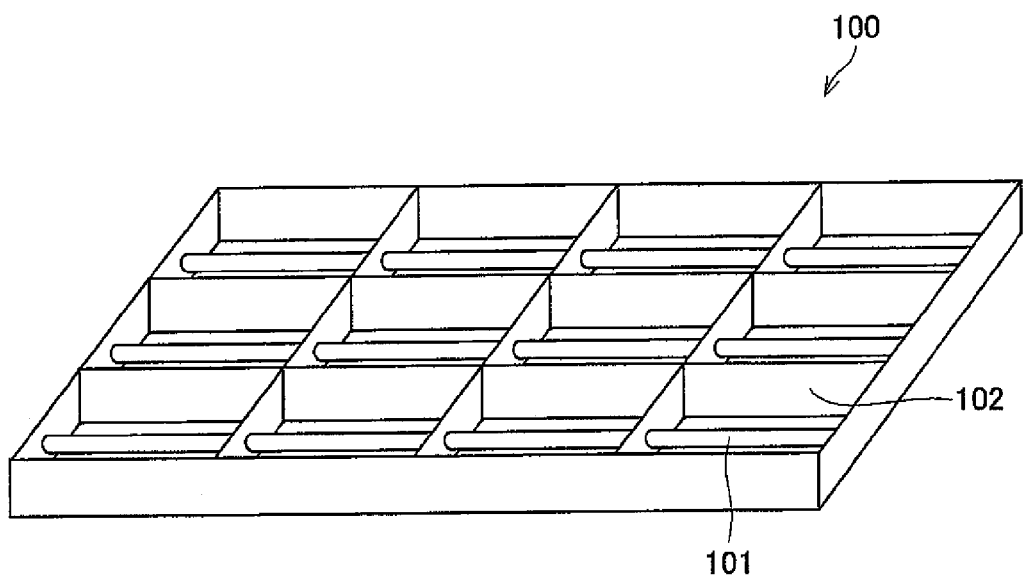
FIG. 8 is a perspective view of a structure of a relevant portion of an illumination device in accordance with a conventional art.

FIG. 7A is a plan view of a vertex of a first partition wall 12 on which a diffusion section 24 is provided, in place of the projection section 20, the projection section 21, the projection section 22 or the projection section 23 previously described. FIG. 7B is a side view of the first partition wall 12 and of the projection section 24 shown in FIG. 7A. FIG. 7C is a perspective view of the projection section 24 shown in FIG. 7A.

As shown in FIGS. 7A-7C, the diffusion section 24 is provided on the vertex of the first partition wall 12. The diffusion section 24 is preferably made from a material (diffusion material) allowing a better diffusion of light than the material used for the first partition wall 12. For example, the diffusion material may be foamed thereby introducing air particles therein.

In the present preferred embodiment, the diffusion element 24 is preferably formed by forming an upper portion of the first partition wall 12 with the diffusion material. The upper portion preferably is about 1 mm to about 2 mm deep, for example, from the upper surface of the vertex in the present preferred embodiment. Further, the vertex of the first partition wall 12 and the diffusion material are, for example, bonded with an adhesive agent. The adhesive agent is not limited particularly, and any widely used bonding agent allowing the bonding of the vertex of the first partition wall 12 and the diffusion element 24 may be used with the present preferred embodiment.

Because the diffusion section 24 is provided on the first partition wall 12, it is not necessary to perform the incision or the shaping of the resin, in contrast to the cases in which the projection sections 20 to 23 are provided.

Because the diffusion section 24 is provided on the upper surface of the vertex of the first partition wall 12, as shown in FIG. 1, the light respectively emitted from the LED 11R, the LED 11G and the LED 11B is reflected by the surface of the diffusion element 24 when reaching the diffusion element 24. Because the diffused light is then irradiated by the neighboring diffusion plate 15, it is possible to gradate the color irregularity. In other words, it is possible to reduce the color irregularity.

At this point, because the light is diffused by the surface of the diffusion section 24, a colored contour having a planar shape of the diffusion section 24 (see FIG. 7A) is irradiated on the neighboring diffusion plate 15. However, because the diffusion section 24 is made from a diffusion material, and because of the gradation effect of the color irregularity, the colored contour on the flat surface of the projection section 23 is hardly visible to the human eye. Because a diffusion element 24 is provided on the upper surface of the vertex of the first partition wall 12 in this way, the color irregularity irradiated on the diffusion sheet 15 when one of adjoining light source blocks 10 is turned on while the other is turned off can be reduced, compared to a configuration in which the diffusion element 24 is not provided.

The above preferred embodiments of the present invention being thus described, it should be understood that the present invention may be varied in many ways. Such variations are not to be regarded as a departure from the spirit and scope of the present invention, and all such modifications as would be easily understood and clear to one skilled in the art are intended to be included within the scope of the following claims.

As described above, the illumination device in accordance with a preferred embodiment of the present invention includes a plurality of illumination areas defined by partition walls, and a light source in each illumination area, and is capable of adjusting luminance of each illumination area independently. The illumination device further comprises a diffusion section on a vertex of each partition wall, for diffusing the light.

With this configuration, the light emitted from the light source of the illumination area is diffused by the diffusion section provided on the vertex of the partition wall. As a result, it is possible to prevent the luminance irregularities occurring when adjusting the luminance for each adjoining illumination area.

Further, because the diffusion section is provided on the vertex of the partition wall, it is not necessary to increase the width of the partition wall when adding the diffusion section. Further, because the diffusion section is provided on the vertex of the partition wall, it is possible to provide a path of the light (light path) emitted from each of the adjoining illumination areas so as to make it symmetric to the vertex of the partition wall. As a result, compared to when the diffusion section is not provided on the vertex of the partition wall, it is possible to efficiently provide the diffusion section and to efficiently prevent the luminance irregularities occurring when adjusting the luminance for each adjoining illumination area.

In the illumination device in accordance with a preferred embodiment of the present invention, the partition walls include first partition walls defining the plurality of illumination areas and second partition walls surrounding the plurality of illumination areas. The illumination device in accordance with a preferred embodiment of the present invention further includes a transparent member arranged to transmit the light from the light source, wherein the transparent member is supported by the second partition wall, a combined height of the first partition wall and of the diffusion section being lower than a height of the second partition wall.

With this configuration, a height of the transparent member is determined based on the height of the second partition wall. As a result, a space is provided between the transparent member and the diffusion section. In other words, it is possible to determine a size of this space within the range between the height of the transparent member (determined based on the height of the second partition member) and the combined height of the first partition wall and the diffusion section.

When the plurality of illumination areas emit light at the same luminance, the light is mixed in the space. In other words, the light emitted by the plurality of illumination areas is mixed within the range between the height of the transparent member (determined based on the height of the second partition member) and the combined height of the first partition wall and the diffusion section. As a result, it is possible to prevent the luminance in the vicinity of the projection section from becoming dark. Accordingly, it is possible to achieve a uniform irradiated light while preventing luminance irregularity.

In the illumination device in accordance with a preferred embodiment of the present invention, the light sources preferably include a plurality of light sources having different wavelengths. With this configuration, because the light is emitted from a plurality of light sources having various wavelengths, it is possible to widen the luminance ratio of the light between adjoining illumination areas. In other words, it is possible to expand the dynamic range of the adjoining light sources.

In the illumination device in accordance with a preferred embodiment of the present invention, each diffusion section includes a surface facing along an extension of the first partition walls, so that the surfaces facing the extension of the first partition walls are provided in plurality along the extension of the first partition walls. With this configuration, the light emitted from the light source is reflected from the plurality of surfaces arranged along the extension direction of the first partition wall. Then, the reflected light is reflected again by the adjoining surfaces formed in the extension direction of the first partition wall. In other words, because the light emitted from the light source is repeatedly reflected by the surfaces adjoining each other and is thus diffused, it is possible to gradate the color irregularity. Accordingly, it is possible to prevent the color irregularity.

The light emitted by the light source is reflected through the shape defined by the plurality of surfaces arranged along the extension direction of the first partition wall. This causes a color irregularity, having the same shape as the planar shapes arranged along the extension direction of the first partition wall. However, because the surfaces are arranged adjoiningly and because of the above gradation effect of the color irregularity, the color irregularity shaped like the previously described plane shape is hardly visible to the human eye.

In the illumination device in accordance with a preferred embodiment of the present invention, the diffusion section includes a plurality of projection sections having a triangular cross section in the extension direction of the first partition walls. Alternatively, each diffusion section has a surface having a repeatedly bended shape, along a side surface of the first partition walls.

With this configuration, the light emitted from the light source is reflected by the triangular shape of the section of the projection sections in the extension of the partition wall, or alternatively by the repeatedly bended shape. Then, the reflected light changes angle and is reflected again due to a projection section adjoining to the projection section, or alternatively due to a bended shape adjoining to the bended shape.

In other words, because the light emitted from the light source is repeatedly reflected, and thus diffused, due to a projection section adjoining to the projection section or alternatively due to the repeatedly bended shape, it is possible to gradate the color irregularity. Accordingly, it is possible to prevent the color irregularity.

Further, due to the triangular shape of the section of the projection section arranged along the extension direction of the partition wall, or alternatively due to the repeatedly bended shape, the reflected light changes angle when reflected. Accordingly, the diffusion angle of the light becomes wider. As a result, it is possible to further prevent the color irregularity.

In the illumination device in accordance with a preferred embodiment of the present invention, the diffusion section includes a plurality of projection sections, each of which is hemispherical or substantially hemispherical, for example. Alternatively, the diffusion section includes a plurality of projection sections, each of which is conical, for example.

With this configuration, the light emitted from the light source is reflected by the hemispherical shape or the conical shape of the projection section. Then, the reflected light changes angle due to a projection section adjoining to the projection section, and is reflected again.

In other words, because the light emitted from the light source is reflected repeatedly and thus diffused due to the fact that the projection sections are formed adjoiningly, it is possible to gradate the color irregularity. Accordingly, it is possible to prevent the color irregularity.

Further, because the projection section preferably is hemispherical or conical, for example, the light is reflected at a determined angle due to a curve of the hemispherical or conical shape. Then, due to a projection section adjoining to the projection section, the reflected light is reflected again at a determined angle. With this configuration, because of the hemispherical or conical shape, the light overlaps and is diffused.

As a result, it is at the same time possible to efficiently diffuse the light emitted from the light source and possible to overlap and gradate the color irregularities. Accordingly, it is possible to control the color irregularities in an even more efficient way.

In the illumination device in accordance with a preferred embodiment of the present invention, the diffusion section is preferably made from a diffusion material diffusing light.

With this configuration, the light emitted from the light sources is diffused by the vertex of the partition wall, made from the diffusing material. As a result, it is possible to prevent the luminance irregularity occurring when adjusting the luminance of each adjoining illumination area.

A liquid crystal display device in accordance with a preferred embodiment of the present invention is provided with the illumination device. With this configuration, it is possible to provide a liquid crystal display device in which luminance irregularity and color irregularity are prevented but a wide dynamic range is attained.

As described above, the illumination device in accordance with a preferred embodiment of the present invention includes a plurality of illumination areas defined by partition walls, and a light source in each illumination area, and is capable of adjusting luminance of each illumination area independently. The illumination device further includes a diffusion section on a vertex of each partition wall, to diffuse the light.

As a result, it is possible to prevent the luminance irregularity occurring when adjusting the luminance of each adjoining light source.

Because various preferred embodiments of the present invention make it possible to prevent the light irregularity in the illumination area occurring when adjusting the respective luminance of each of the plurality of illumination areas, the preferred embodiments of the present invention can be widely applied to any type of electronic device provided with a surface light source and required to have a wide dynamic range for light quantity control purposes.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An illumination device comprising:
a plurality of illumination areas defined by partition walls, the partition walls including a first partition wall defining the plurality of illumination areas and a second partition wall surrounding the plurality of illumination areas;
a light source located in each of the plurality of illumination areas, and arranged to independently adjust luminance of each of the plurality of illumination areas; and
a diffusion section located on a vertex of the first partition wall.

2. The illumination device according to claim 1, wherein the first partition wall is provided in a lattice-shaped form.

3. An illumination device comprising:
a plurality of illumination areas defined by partition walls;
a light source located in each of the plurality of illumination areas, and arranged to independently adjust luminance of each of the plurality of illumination areas; and
a transparent member arranged to transmit the light from the light source, wherein:
the partition walls include:
a first partition wall defining the plurality of illumination areas; and
a second partition wall surrounding the plurality of illumination areas;
a diffusion section is located on a vertex of the first partition wall to diffuse light;
the transparent member is supported by the second partition wall; and
a combined height of the first partition wall and of the diffusion section is lower than a height of the second partition wall.

4. The illumination device according to claim 3, wherein the light sources include a plurality of light sources having different wavelengths.

5. The illumination device according to claim 3, wherein each of the diffusion sections includes a surface facing along an extension direction of the first partition wall, so that the surfaces facing the extension direction of the first partition wall are provided in plurality along the extension direction of the first partition wall.

6. The illumination device according to claim 3, wherein the diffusion section comprises a plurality of projection sections having a triangular cross section in an extension direction of the first partition wall.

7. The illumination device according to claim 3, wherein each of the diffusion sections has a surface having a repeatedly bended shape, along a side surface of the first partition wall.

8. The illumination device according to claim 3, wherein the diffusion section is made from a diffusion material that diffuses light.

9. A liquid crystal display device comprising an illumination device according to claim 3.

10. An illumination device comprising:
a plurality of illumination areas defined by partition walls;
a light source located in each of the plurality of illumination areas, and arranged to independently adjust luminance of each of the plurality of illumination areas; and
a diffusion section located on a vertex of each of the partition walls to diffuse light; wherein the diffusion section comprising a plurality of projection sections, each of the plurality of projection sections having a hemispherical or substantially hemispherical shape.

11. An illumination device comprising:
a plurality of illumination areas defined by partition walls;
a light source located in each of the plurality of illumination areas, and arranged to independently adjust luminance of each of the plurality of illumination areas; and
a diffusion section located on a vertex of each of the partition walls to diffuse light; wherein
the diffusion section comprising a plurality of projection sections, each of the plurality of projection sections having a conical or substantially conical shape.

* * * * *